Patented Aug. 1, 1933

1,920,432

UNITED STATES PATENT OFFICE 1,920,432

NICKEL WELDING WIRE CONTAINING TITANIUM

Norman B. Pilling, Elizabeth, N. J., and Theodore E. Kihlgren, West New Brighton, Staten Island, N. Y., assignors to the International Nickel Company, Inc., of New York, N. Y., a Corporation of Delaware No Drawing. Application September 6, 1929
Serial No. 390,857

12 Claims. (Cl. 219—8)

The present invention relates to nickel and more especially to compositions of malleable nickel well adapted for fusion welding.

One of the objects of this invention is to produce for industry a nickel composition which has an exceptional resistance to the conditions of fusion encountered during welding, i. e., which will tend to preserve unchanged during welding those auxiliary elements of the composition that are desirable to insure soundness and ductility.

Another object is to provide a nickel composition particularly suited for use as a filler wire or metallic electrode in gas or arc welding, such that although the nickel parts to be joined may themselves be deficient in welding quality, this filler may contribute such values to the total weld fusion that soundness, high strength, toughness and ductility result.

A still further object is the provision of a nickel composition well suited for imparting high physical quality to nickel fusion welds produced either with gas flames, such as oxy-hydrogen and oxy-acetylene, or by any of the several methods of electrical welding.

It is generally known that, in order to have the quality of malleability, nickel must be processed with and have a certain small content of magnesium. This function of magnesium is considered to be concerned with the trace of sulphur usually present, insuring that this sulphur content occurs as an infusible magnesium sulphide instead of a fusible nickel sulphide. Experience has taught that nickel, suitably processed with magnesium to yield sound ingots and an excellent degree of malleability (such as will permit reduction to thin sheet and wire) may yield welds which are extremely porous, have a very low strength and break apart when slightly stretched or bent. It is thought that this is possibly one result of the more severe conditions of fusion in welding as compared with melting in furnaces.

It has been shown in the co-pending application of Norman B. Pilling, Serial No. 390,856, filed September 6, 1929, that this defect in welding quality cannot be rectified by simply increasing the magnesium content, but that by providing the addition of a silicon content a very satisfactory improvement in the quality of fusion welds results.

It has now been found that even more highly improved welding qualities may be imparted to commercial nickel or its alloys, when such nickel or its alloys are conjointly treated in a molten condition with magnesium, a non-refractory magnesium retaining element such as silicon and a refractory magnesium retaining element such as titanium in certain restricted proportions.

It is believed that magnesium exerts a double function, in part serving to fix any sulphur present in harmless form in the solid weld metal, in part preventing the precipitation of gas during freezing. It is also believed that the silicon aids also in preventing gas holes and its oxidation product helps in fluxing the magnesium and titanium oxides formed during welding. The titanium also acts protectively, its high boiling point assuring not only its own retention in the fusion even at such high temperatures as are involved in arc welding, but its high reactivity together with the nature of its reaction product, further aid in conserving magnesium and in preventing the absorption of nitrogen. Thus by helping to retain magnesium and preventing the absorption of nitrogen and providing fluxing aid, silicon and titanium confer a highly improved welding quality to nickel and its alloys, so that sound welds with high tensile strength and elongation properties are obtained.

Although the believed reasons for the use of magnesium, silicon and titanium are recited above, it is to be understood that the theory of these reasons may change. However, it has been found that most satisfactory and efficient welds have been obtained when magnesium, silicon and titanium are employed.

The amounts or quantities of these elements may vary considerably to obtain the nickel or nickel alloy that gives the desired characteristics. However, there are various limits and ranges within which the most satisfactory results are obtained. The magnesium content preferably varies from .02 to .2 percent, while the silicon and titanium may vary from .05 to 4.0 and .05 to 2.0 percent, respectively. The oxidation products of both magnesium and titanium being refractory in nature may interfere with the proper union of the melted surfaces, if care is not taken to restrict their amounts. While arc welding methods may tolerate a greater content of both magnesium and titanium, it is advantageous to restrict their amount in gas welding. The amount of the refractory elements (such as magnesium and titanium) usable is somewhat proportional to the amount of the fluxing element such as silicon. Usually the higher the amount of silicon employed, the higher will be the total amount of magnesium and titanium permissible. In preferred practice when gas welding is to be used, the amount of magnesium plus one-fourth of the amount of titanium should not substantially exceed 0.30 percent. For general use in welding wire, adapted for both gas and arc welding, the advantageous range of composition is silicon .2 to .6%, titanium .2 to .6% and magnesium .06 to .12 percent. An excellent composition may be made with Si .4% Ti .4% and Mg .10%. Nickel ingots within the composition ranges mentioned above are sound, have good malleability and can be satisfactorily worked hot or cold to sheet, plate, wire and other forms having good physical properties.

The following tension tests of nickel butt welds illustrate the high physical quality of the improved nickel composition. The tests were made from the same supply of plate nickel which was wholly free from titanium. In one case the filler was identical with the plate, in the other it contained Si .41%, Ti .34% and Mg .11%.

| Type of filler | Welding method | Breaking stress lbs. per sq. in. | Elongation % in 2" |
|---|---|---|---|
| Like plate | Oxyacetylene | 36,750 | 8.5 |
|  | Metallic arc (coated) | 37,100 | 9.0 |
| With titanium present. | Oxyacetylene | 50,200 | 18.0 |
|  | Metallic arc (coated) | 48,800 | 20.0 |

The arc welding tests were made with electrodes coated with a flux containing titanium and demonstrate also the insufficiency of supplying titanium from external sources of this nature to obtain the desired result.

It is to be understood that the improved nickel welding wire composition, can not only be used in joining parts of nickel, but also of other materials such as nickel alloys, various steels, cast irons, etc., where a tough welded joint is desired. In oxy-acetylene welding the wire may be used bare or with suitable fluxes to assist penetration. In arc welding some protective coating on the welding wire is desirable although welds have been produced in the metallic arc with bare filler having a high strength and an elongation as great as 8 percent.

It is to be further understood that the invention is applicable not only to metallic nickel but to nickel alloys which contain a substantial proportion of nickel such as nickel-copper alloy, Monel metal, nickel-chromium alloy, etc. Such nickel or its alloys may contain small amounts of other elements that are commonly present in the commercial metal, as carbon, manganese and cobalt. The use of commercially available titanium intermediates may necessitate the presence of still other elements such as iron or aluminum in amounts up to 8%, depending on the titanium content. Compositions suitable for use in welding nickel will in general contain 90% or more of nickel. The scope of the invention also includes the use of other protective, auxiliary elements in place of silicon and titanium, one of which has a fluxing function and may be designated as a fluxing type of element, and the other being refractory, which may be designated as a refractory type. Either one or both may have a boiling point higher than magnesium.

While the foregoing disclosure is subject to changes and modifications, it is to be understood that such changes and modifications are to be considered to be within the scope of the invention as outlined by the following claims:

We claim:

1. As an article of manufacture, a welding element composed of a major portion of refined nickel, about 0.20% to about 4.0% silicon, about 0.05% to about 2.0% titanium, and more than 0.12% to about 0.2% magnesium, said magnesium being present in amount sufficient not only to combine with the sulphur present but also to be available for functioning actively during fusion welding.

2. As an article of manufacture, a welding element composed of more than about 90% refined nickel, about 0.20% to about 0.60% silicon, about 0.20% to about 0.60% titanium and about 0.02% to about 0.2% magnesium, said magnesium being present in amount sufficient not only to combine with the sulphur present but also to be available for functioning actively during fusion welding.

3. As an article of manufacture, a welding element composed of more than about 90% refined nickel, about 0.20% to about 0.6% silicon, about 0.20% to about 0.60% titanium and more than about 0.12% to about 2.0% magnesium, said magnesium being present in amount sufficient not only to combine with the sulphur present but also to be available for functioning actively during fusion welding.

4. As an article of manufacture, a welding element composed of more than about 90% refined nickel, about 0.40% silicon, about 0.40% titanium and more than about 0.12% magnesium, said magnesium being present in amount sufficient not only to combine with the sulphur present but also to be available for functioning actively during fusion welding.

5. A sound, strong, tough, ductile and practically gas-free weld composed of a major portion of refined nickel, about 0.20%, to about 4.0% silicon, about 0.05% to about 2.0% titanium, and more than about 0.12% to about 0.2% magnesium.

6. A sound, strong, tough, ductile and practically gas-free weld composed of more than about 90% refined nickel, about 0.20% to about 0.6% silicon, about 0.20% to about 0.60% titanium and more than about 0.12% to about 2.0% magnesium.

7. A sound, strong, tough, ductile and practically gas-free weld composed of more than about 90% nickel, about 0.40% silicon, about 0.40% titanium and more than about 0.12% magnesium.

8. As a composition of matter for use in fusion welding to yield sound, strong, tough, ductile and practically gas-free welds, a nickel alloy composed of more than about 90% of refined nickel, about 0.20% to about 4.00% of silicon, about 0.05% to about 2.0% titanium, and more than about 0.12% to about 2.0% magnesium, said magnesium being present in amount sufficient not only to combine with the sulphur present but also to be available for functioning actively during fusion welding.

9. As a composition of matter for use in fusion welding to yield sound, strong, tough, ductile and practically gas-free welds, a nickel alloy composed of more than about 90% of refined nickel, about 0.20% to about 0.6% silicon, about 0.20% to about 0.60% titanium and more than about 0.12% to about 2.0% magnesium, said magnesium being present in amount sufficient not only to combine with the sulphur present but also to be available for functioning actively during fusion welding.

10. As a composition of matter for use in fusion welding to yield sound, strong, tough, ductile and practically gas-free welds, a nickel alloy composed of more than about 90% of refined nickel, about 0.40% silicon, about 0.40% titanium and more than about 0.12% magnesium, said magnesium being present in amount sufficient not only to combine with the sulphur present but also to be available for functioning actively during fusion welding.

11. A composition of matter as set forth in claim 10 in which carbon, manganese and iron are contained in the alloy.

12. A composition of matter composed of more than about 90% of refined nickel, about 0.20% to about 4.00% of silicon, about 0.05% to about 2.0% titanium, and more than about 0.12% to about 0.2% magnesium.

NORMAN B. PILLING.
THEODORE E. KIHLGREN.